(12) United States Patent
Ravichandran et al.

(10) Patent No.: US 11,619,201 B1
(45) Date of Patent: Apr. 4, 2023

(54) METHODS AND SYSTEM FOR RESERVING TORQUE FOR ENGINE STARTING

(71) Applicant: Ford Global Technologies, LLC, Dearborn, MI (US)

(72) Inventors: Maruthi Ravichandran, Dearborn, MI (US); Ravikumar Tumu, Westland, MI (US); Jason Meyer, Canton, MI (US); Rajit Johri, San Francisco, CA (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 17/449,216

(22) Filed: Sep. 28, 2021

(51) Int. Cl.
*F02N 11/08* (2006.01)
*F02N 11/04* (2006.01)

(52) U.S. Cl.
CPC .......... *F02N 11/0851* (2013.01); *F02N 11/04* (2013.01); *F02N 2200/022* (2013.01); *F02N 2200/0802* (2013.01); *F02N 2200/10* (2013.01)

(58) Field of Classification Search
CPC ...... B60W 10/02; B60W 10/06; B60W 10/08; B60W 20/40; B60K 2006/268
USPC ...................................... 123/179.3
See application file for complete search history.

(56) References Cited

U.S. PATENT DOCUMENTS

| | | | |
|---|---|---|---|
| 8,594,913 B2 | 11/2013 | Steuernagel | |
| 9,393,950 B2 | 7/2016 | Yamazaki et al. | |
| 9,669,824 B2 | 6/2017 | Thompson et al. | |
| 9,731,710 B2 | 8/2017 | Gibson et al. | |
| 9,802,602 B2 | 10/2017 | Yamazaki et al. | |
| 10,106,148 B2 | 10/2018 | Meyer et al. | |
| 10,272,907 B2 | 4/2019 | Johri et al. | |
| 11,085,389 B1* | 8/2021 | Kizer | F02N 11/0829 |
| 2011/0301797 A1* | 12/2011 | Steuernagel | F02N 19/00 903/902 |
| 2013/0291830 A1* | 11/2013 | Doering | F02D 41/023 123/350 |
| 2013/0296126 A1* | 11/2013 | Gibson | B60L 50/16 903/902 |
| 2013/0296132 A1* | 11/2013 | Doering | B60W 10/02 477/86 |
| 2013/0297105 A1* | 11/2013 | Yamazaki | B60K 6/387 903/902 |
| 2016/0031435 A1* | 2/2016 | Gibson | B60K 6/387 180/65.265 |
| 2017/0259808 A1 | 9/2017 | Makled et al. | |

(Continued)

FOREIGN PATENT DOCUMENTS

DE 102010060681 A1 5/2012

OTHER PUBLICATIONS

Ravichandran, M. et al., "Methods and System for Starting an Engine," U.S. Appl. No. 17/443,925, filed Jul. 28, 2021, 35 pages.

*Primary Examiner* — Phutthiwat Wongwian
*Assistant Examiner* — Arnold Castro
(74) *Attorney, Agent, or Firm* — David Kelley; McCoy Russell LLP

(57) ABSTRACT

Systems and methods for operating a hybrid vehicle are described. In one example, a torque reserve for starting an engine via an electric machine is adjusted responsive to vehicle operating conditions. The torque reserve may set aside a portion of torque that an electric machine may produce for cranking and starting an engine.

19 Claims, 5 Drawing Sheets

(56) References Cited

U.S. PATENT DOCUMENTS

| | | |
|---|---|---|
| 2017/0259810 A1 | 9/2017 | Zhang et al. |
| 2018/0306157 A1 | 10/2018 | Lee et al. |
| 2018/0340503 A1 | 11/2018 | Kim |
| 2019/0376483 A1 | 12/2019 | Khaagy et al. |
| 2020/0231136 A1* | 7/2020 | Johri .................. F16H 61/0213 |
| 2021/0171012 A1* | 6/2021 | Ravichandran ....... B60W 10/06 |
| 2021/0300316 A1* | 9/2021 | Doering ................ B60W 10/02 |
| 2022/0097677 A1* | 3/2022 | Meyer .................. B60W 10/08 |

* cited by examiner

METHODS AND SYSTEM FOR RESERVING TORQUE FOR ENGINE STARTING

FIELD

The present description relates to methods and a system for reserving torque of an electric machine for starting an internal combustion engine.

BACKGROUND AND SUMMARY

An internal combustion engine may be started via rotating the engine via an electric machine and supplying fuel and spark to engine cylinders. The electric machine that rotates the engine during engine starting may serve more functions than starting the engine. For example, the electric machine may operate as a generator during some conditions. In addition, the electric machine may provide torque to propel a vehicle while it is simultaneously supplying torque to start the internal combustion engine. Preferably, the electric machine may provide the driver demand torque that is requested while the engine is not started. However, the driver demand torque may change significantly when the engine is not started. If the electric machine provides the driver demand torque before the engine is started, the electric machine may have insufficient torque to start the engine. Therefore, it may be desirable to provide a way of ensuring that the engine may be started even if driver demand increases.

The inventors herein have recognized the above-mentioned issues and have developed a method for operating a powertrain, comprising: adjusting a torque reserve amount of an electric machine via a controller in response to a characterization of a restart request of an engine after beginning engine shutdown and before stopping rotation of the engine.

By adjusting a torque reserve amount of an electric machine in response to a characterization of a restart request of an engine after beginning engine shutdown and before stopping rotation of the engine, it may be possible to provide the technical result of reducing torque disturbances during starting of an engine of a hybrid vehicle. In particular, a torque reserve for an electric machine may be applied to ensure that there is sufficient torque available from the electric machine to start the engine. The torque reserve may allow the electric machine to meet driver demand torque and propel the vehicle without causing a torque hole or driveline torque disturbance when a driveline disconnect clutch is engaged to start an engine.

The present description may provide several advantages. In particular, the approach may reduce a possibility of generating driveline torque disturbances during an engine restart. Further, the approach may provide improved vehicle drivability. In addition, the approach may improve engine restarting when an engine has not stopped rotating.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
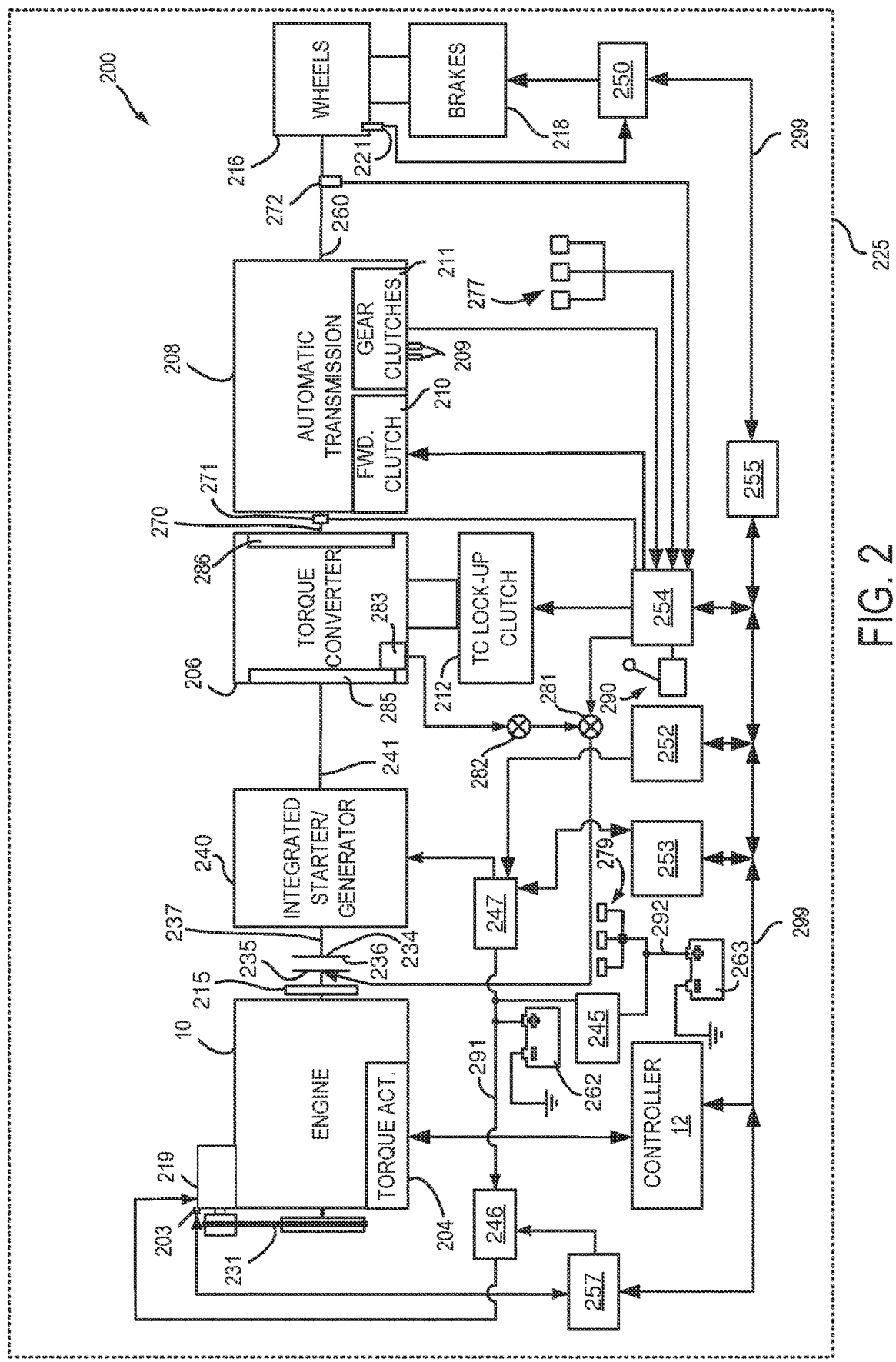
FIG. 2 is a schematic diagram of a vehicle driveline.
Figure 3:
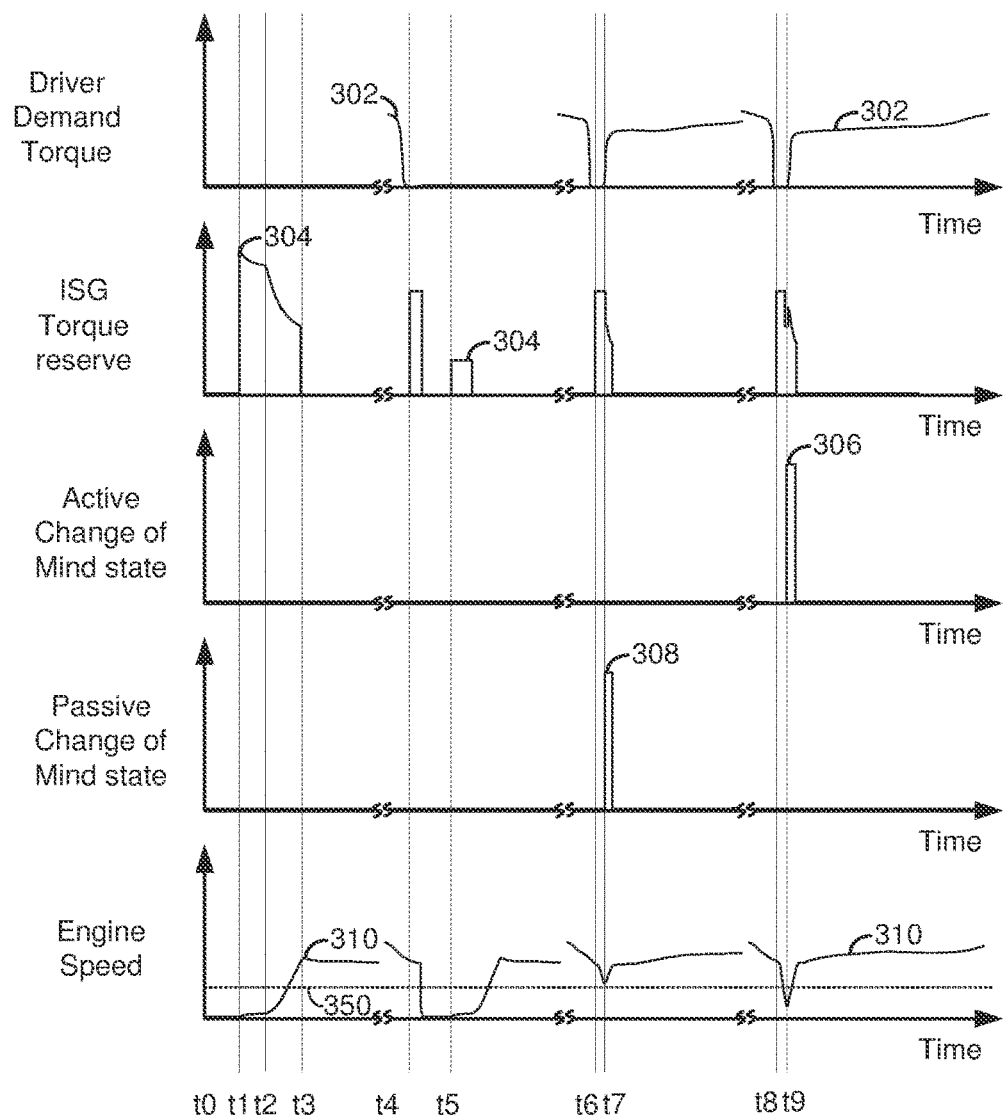
FIG. 3 shows several example engine starting sequences according to the method of FIGS. 4 and 5.

The present description is related to maintaining a torque reserve of an electric machine for starting an internal combustion engine. The torque reserve may be applied or used by the electric machine to start the internal combustion engine when a vehicle is being propelled by the electric machine or when the vehicle is stopped. The internal combustion engine may be of the type shown in FIG. 1 or a diesel engine. The engine may be included in a driveline as shown in FIG. 2 or in another known hybrid driveline configurations (e.g., series or parallel). Engine stopping and starting may be performed as shown in FIG. 3 according to the method of FIGS. 4 and 5.

Figure 1:
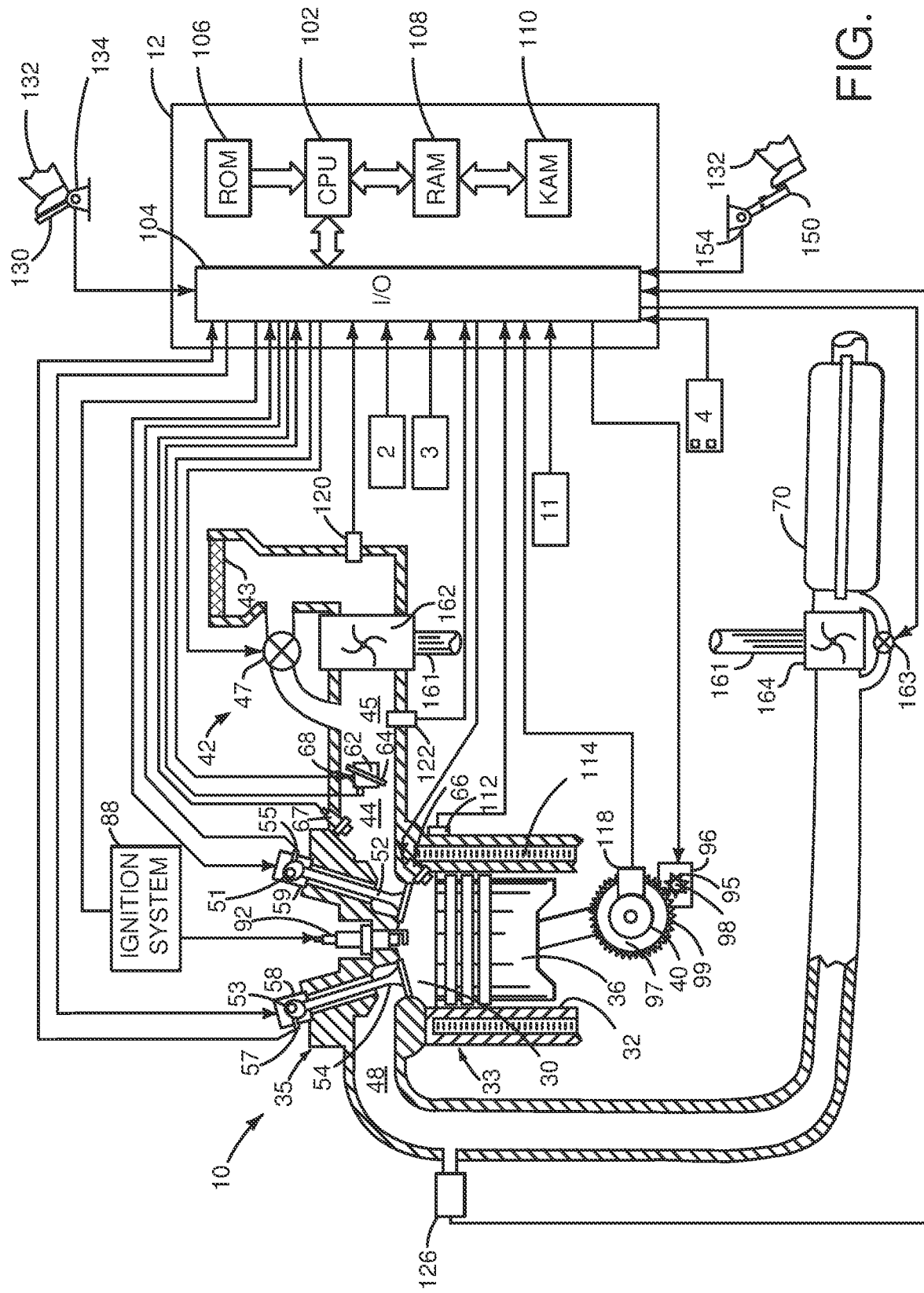
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2. The controller employs the actuators shown in FIGS. 1 and 2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Optional starter 96 may be directly mounted to the front of the engine or the rear of the engine. In some examples, starter 96 may selectively supply power to crankshaft 40 via a belt or chain. In addition, starter 96 is in a base state when not engaged to the engine crankshaft 40 and flywheel ring gear 99. Starter 96 may be referred to as a flywheel starter.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device. Controller 12 may also receive navigation and GPS data (e.g., locations of lights, signs, roads, etc.) from GPS receiver/navigation system 2. Controller 12 may interface with other vehicles to receive traffic data (e.g., locations of other vehicles, traffic flow, etc.) from connected vehicle interface 3. Controller 12 may receive proximity data from other vehicles via vehicle proximity sensing system 4. A user may select and/or request a vehicle drive mode (e.g., economy, track, highway, hill descent, etc.) via the human machine interface 11.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, first electric machine controller 252, second electric machine controller 257, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 12, first electric machine controller 252, second electric machine controller 257, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via belt integrated starter/generator (BISG) 219, or via driveline integrated starter/generator (ISG) 240 also known as an integrated starter/generator. A temperature of BISG 219 may be determined via optional BISG temperature sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include a belt integrated starter/generator (BISG) 219. BISG 219 may be coupled to crankshaft 40 of engine 10 via a belt 231. Alternatively, BISG 219 may be directly coupled to crankshaft 40. BISG 219 may provide a negative torque to driveline 200 when charging higher voltage electric energy storage device 262 (e.g., a traction battery). BISG 219 may also provide a positive torque to rotate driveline 200 via energy supplied by lower voltage electric energy storage device (e.g., a battery or capacitor) 263. In one example, electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 246 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 246 converts DC power to AC power and vice-versa to enable power to be transferred between ISG 219 and electric energy storage device 262. Likewise, inverter 247 converts DC power to AC power and vice-versa to enable power to be transferred between ISG 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine; an integrated starter/generator (ISG); a driveline disconnect clutch; and a controller including executable instructions stored in non-transitory memory that cause the controller to adjust a torque reserve of the ISG for engine starting in response to an engine stop request. The system further comprises additional instructions to restart the engine in response to an increasing driver demand torque. The system further comprises additional instructions to adjust the torque reserve in response to a speed of the ISG. The system further comprises a transmission, and additional instructions to adjust the torque reserve in response to an engaged gear of the transmission. The system further comprises additional instructions to adjust the torque reserve in response to a vehicle drive mode. The system includes where adjusting the torque reserve in response to the vehicle drive mode includes increasing the torque reserve for a sport drive mode. The system further comprises additional instructions to adjust the torque reserve in response to a speed of the engine. The system includes where adjusting the torque reserve includes decreasing the torque reserve as engine speed increases.

Referring now to FIG. 3, several example engine stopping and starting events are shown. The sequence of FIG. 3 may be provided by the system of FIGS. 1 and 2 in cooperation with the method of FIGS. 4 and 5. The plots of FIG. 3 are time aligned and they begin and end at the same times. The vertical lines t0-t9 represent times of interest in the sequence. The double SS marks along the horizontal axes represent a break in time and the duration of the break may be long or short.

The first plot from the top of FIG. 3 is a plot of driver demand torque versus time. The vertical axis represents driver demand torque and the driver demand torque increases in the direction of the vertical axis arrow. The horizontal axis represents time and time increases from the left side of the plot to the right side of the plot. The driver demand torque may be determined via a function that is referenced by driver demand pedal position and vehicle speed. Trace 302 represents the driver demand torque.

The second plot from the top of FIG. 3 is a plot of ISG (e.g., 240 of FIG. 2) torque versus time. The vertical axis represents ISG torque and the ISG torque increases in the direction of the vertical axis arrow. The horizontal axis represents time and time increases from the left side of the plot to the right side of the plot. The ISG torque may be determined via an amount of electrical current that is supplied to the ISG. Trace 304 represents the ISG torque.

The third plot from the top of FIG. 3 is a plot of an active change of mind state versus time. The vertical axis represents the active change of mind state and the active change of mind is active when trace 306 is at a high level near the vertical axis arrow. The active change of mind state is not active when trace 306 is at a low level that is near the horizontal axis. An active change of mind may be a condition where an engine stopping procedure has started, but where engine rotation has not completely stopped before an increase in driver demand torque occurs. The engine stopping procedure may begin by ceasing to inject fuel to one or more engine cylinders during an engine cycle. For an active change of mind to occur, engine speed may be below a threshold speed (e.g., threshold 350) when the driver demand torque is increased. The horizontal axis represents time and time increases from the left side of the plot to the right side of the plot. Trace 306 represents the active change of mind state.

The fourth plot from the top of FIG. 3 is a plot of a passive change of mind state versus time. The vertical axis represents the passive change of mind state and the passive change of mind is active when trace 308 is at a high level near the vertical axis arrow. The passive change of mind state is not active when trace 308 is at a low level that is near the horizontal axis. A passive change of mind may be a condition where an engine stopping procedure has started, but where engine rotation has not completely stopped before an increase in driver demand torque occurs. For a passive change of mind to occur, engine speed may be above a threshold speed (e.g., threshold 350) after the engine stopping procedure has started when the driver demand torque is increased. The horizontal axis represents time and time increases from the left side of the plot to the right side of the plot. Trace 308 represents the passive change of mind state.

The fifth plot from the top of FIG. 3 is a plot of engine speed versus time. The vertical axis represents engine speed and the engine speed increases in the direction of the vertical axis arrow. The horizontal axis represents time and time increases from the left side of the plot to the right side of the plot. Trace 310 represents the engine speed. Line 350 represents a threshold engine speed below which an active change of mind may occur.

At time t0, the engine is not rotating and the driver demand torque is zero. The ISG torque reserve is zero and the active change of mind state is not asserted. In addition, the passive change of mind is not asserted.

At time t1, an engine start request (not shown) causes the ISG torque reserve to increase to a high level in response to the ISG and the driveline disconnect clutch being selected to start the engine (not shown). The active and passive change of mind states are not asserted and the engine speed begins to increase shortly after time t1. The ISG torque reserve for engine starting begins to decrease shortly after time t1 in response to speed of the engine increasing. When engine speed increases, torque to rotate the engine may decrease due to lower frictional forces. Therefore, the ISG torque reserve for engine starting may be reduced so that additional ISG torque may be made available to propel the vehicle.

The engine cranking phase or stage occurs between time t1 and time t2. During cranking, the engine is rotated by an electric machine without combustion occurring in the engine.

At time t2, the engine begins to combust air and fuel and the engine speed begins to increase. The engine driver demand torque remains zero and the ISG torque reserve continues to decline as engine speed increases. The active and passive change of mind states are not asserted.

The engine run-up phase or stage occurs between time t2 and time t3. During engine run-up, the engine speed increases from torque generated by combustion in the engine.

At time t3, the engine rotational speed matches the rotational speed of the ISG (not shown). Therefore, the driveline disconnect clutch is fully closed (not shown) and the ISG torque reserve is reduced to zero so that the ISG may provide all of its torque to the driveline. The active and passive change of mind states remain unchanged. A break in the sequence occurs between time t3 and time t4.

After the break in time following time t3 and before time t4, the engine is rotating and combusting fuel (not shown). The engine speed is at a middle level and the driver demand torque moves from a higher level to zero. The ISG torque reserve is zero and the active and passive change of mind states are not asserted.

At time t4, the driver demand torque is zero and engine shutdown begins via ceasing to fuel engine cylinders (not shown). The engine shutdown begins in response to an engine stop or shutdown request (not shown). The ISG torque reserve for engine starting is increased in response to the engine shutdown beginning and the active and passive change of mind states remain not asserted. The engine speed begins to decrease shortly after time t4.

Between time t4 and time t5, the engine stops rotating and the ISG torque reserve is reduced to zero since an engine starting device has not been selected for cranking the engine the next time the engine is started. The driver demand torque is zero and the active and passive change of mind states are not asserted.

At time t5, an engine start is requested (not shown) and the flywheel starter (e.g., 96 in FIG. 1) is selected to start the engine. The ISG torque reserve for engine starting is set relatively low so that the ISG may assist the flywheel starter if desired and so that the vehicle may be propelled with additional ISG torque during the engine starting period. The active and passive change of mind states are not asserted and the engine is started via the flywheel starter shortly after time t5. A break in the sequence occurs between time t5 and time t6.

After the break in time following time t5 and before time t6, the engine is rotating and combusting fuel (not shown). The engine speed is at a middle level and the driver demand torque is reduced from a higher level to zero. The ISG torque reserve for engine starting is zero and the active and passive change of mind states are not asserted.

At time t6, the driver demand torque is zero and engine shutdown begins via ceasing to fuel engine cylinders (not shown). The engine shutdown begins in response to an engine stop or shutdown request (not shown). The ISG torque reserve for engine starting is increased in response to the engine shutdown beginning. The ISG torque reserve for engine starting is raised to a level that is appropriate for conditions when the engine is being stopped. The active and passive change of mind states remain not asserted and the engine speed begins to decrease shortly after time t6.

At time t7, the driver demand torque increases while engine speed is greater than threshold 350. The passive change of mind state is asserted in response to the engine speed being greater than threshold 350, the engine shutdown having started, and the driver demand torque increasing. The ISG and the driveline disconnect clutch are selected to start the engine so the ISG torque reserve for engine starting is adjusted to a higher level. The ISG and driveline disconnect clutch begin to increase engine speed after time t7 and fuel and spark are resupplied (not shown) to the engine. The engine begins combusting fuel and rotating on its own shortly after time t7. The passive change of mind state is not asserted shortly after the engine is started.

After the break in time following time t7 and before time t8, the engine is rotating and combusting fuel (not shown). The engine speed is at a middle level and the driver demand torque is reduced from a higher level to zero. The ISG torque reserve is zero and the active and passive change of mind states are not asserted.

At time t8, the driver demand torque is zero and engine shutdown begins via ceasing to fuel engine cylinders (not shown). The engine shutdown begins in response to an engine stop or shutdown request (not shown). The ISG torque reserve for engine starting is increased in response to the engine shutdown beginning. The ISG torque reserve for engine starting is raised to a level that is appropriate for conditions when the engine is being stopped. The active and passive change of mind states remain not asserted and the engine speed begins to decrease shortly after time t8.

At time t9, the driver demand torque increases while engine speed is less than threshold 350. The active change of mind state is asserted in response to the engine speed being less than threshold 350, the engine shutdown having started, and the driver demand torque increasing. The ISG and the driveline disconnect clutch are selected to start the engine so the ISG torque reserve for engine starting is adjusted to a higher level. The ISG and driveline disconnect clutch begin to increase engine speed after time t9 and fuel and spark are resupplied (not shown) to the engine. The engine begins combusting fuel and rotating on its own shortly after time t9. The active change of mind state is not asserted shortly after the engine is started.

In this way, a torque reserved for engine starting by an electric machine may be adjusted according to engine starting device, engine speed, ISG speed, and engine operating state. Adjusting the torque reserve for engine starting according to these states may allow the electric machine to provide torque that may be sufficient to start the engine. In addition, electric machine torque that is not reserved for engine starting may be applied to propel a vehicle so that driver demand torque may be met.

Figure 4:
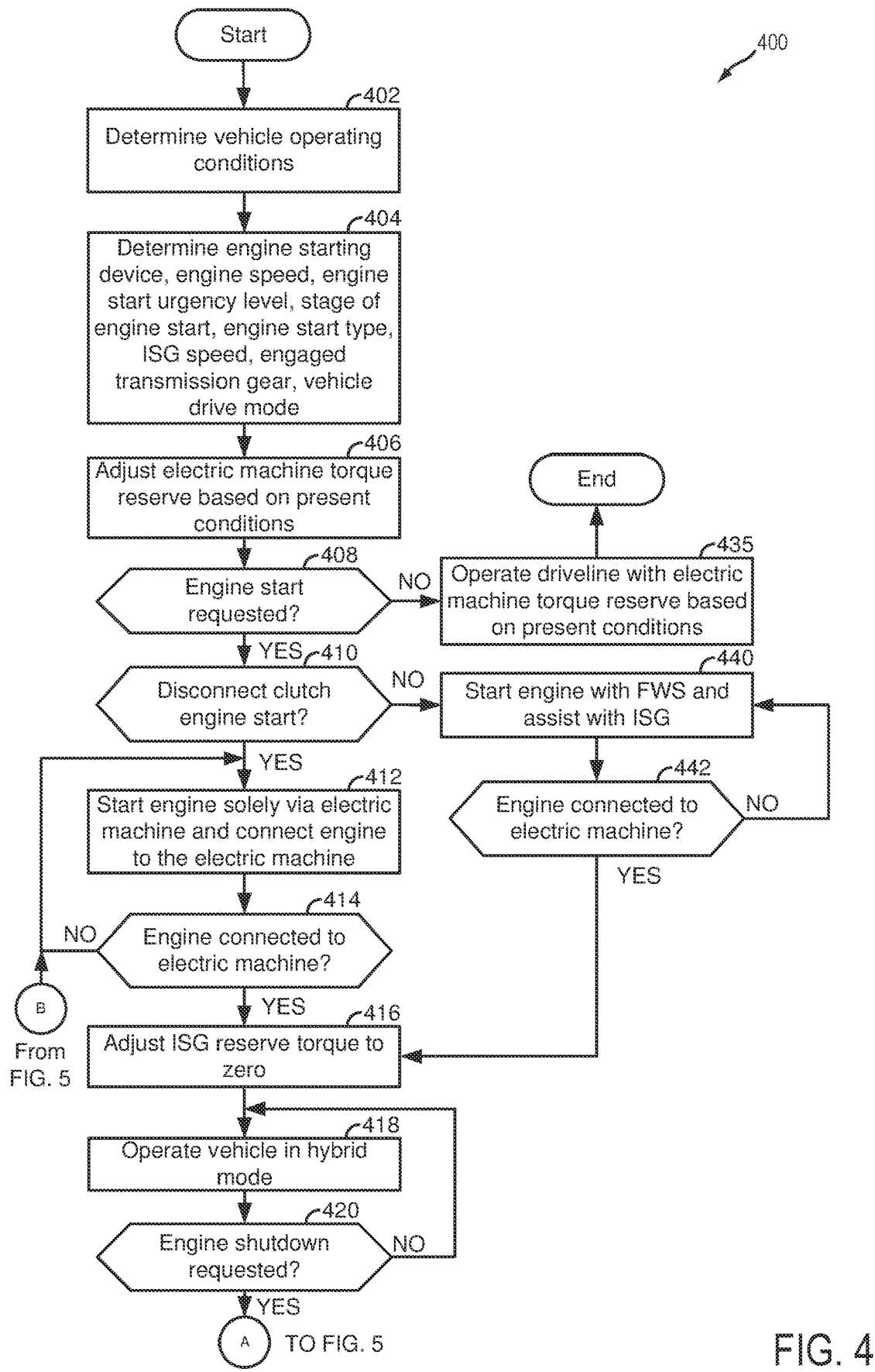
FIGS. 4 and 5 show an example method for adjusting a torque reserve for an electric machine.
Figure 5:
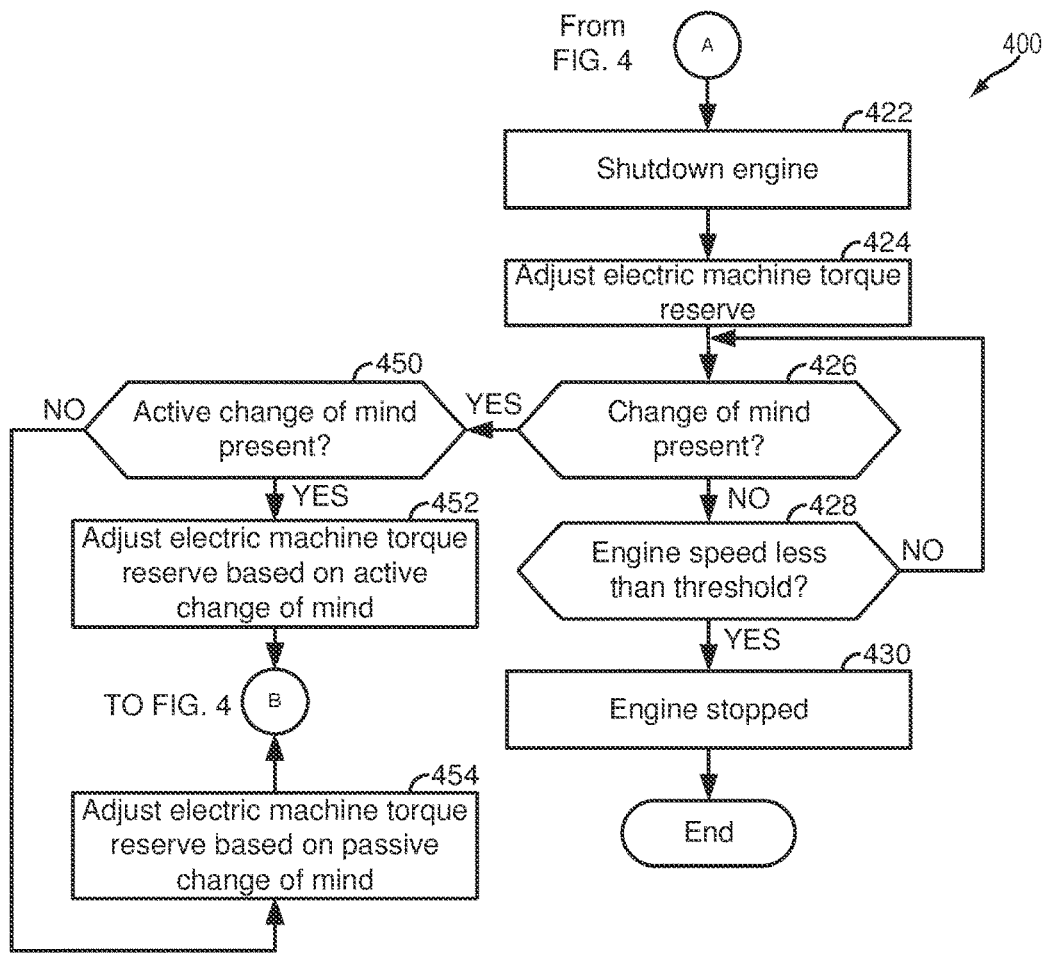

Turning now to FIGS. 4 and 5, a flowchart of a method for stopping and starting engine is shown. The method of FIG. 4 may be incorporated into and may cooperate with the system of FIGS. 1-2. Further, at least portions of the method of FIGS. 4 and 5 may be incorporated as executable instructions stored in non-transitory memory while other portions of the method may be performed via a controller transforming operating states of devices and actuators in the physical world.

At 402, method 400 determines vehicle operating conditions. Vehicle operating conditions may be determined from the vehicle's various sensors and actuators. The vehicle operating conditions may include, but are not limited to engine speed, vehicle speed, driver demand torque, ambient air temperature, barometric pressure, vehicle drive mode (e.g., sport, economy, standard, etc.), and engaged transmission gear, target transmission gear. Method 400 proceeds to 404.

At 404, method 400 determines electric machine torque reserve input control parameters from the determined vehicle operating conditions. Method 400 may determine an engine starting device. Method 400 may choose from a flywheel starter (e.g., 96), a driveline disconnect clutch and ISG (e.g., 240), and/or a belt ISG (e.g., 219). In one example, method 400 may choose the engine starting device based on engine start urgency, engine temperature, ambient temperature, and starting device fault status among other vehicle parameters. For example, if engine temperature and ambient temperature are low, method 400 may select the flywheel starter to start the engine because it may supply higher torque with less vibration and noise at low temperatures. If engine temperature is warm, method 400 may select the driveline disconnect clutch and ISG to start the engine because they may provide a smooth start with very little wear on the engine starting system. If the flywheel starter and driveline ISG are faulted, method 400 may select the belt integrated ISG to start the engine.

Method 400 may also determine a numerical value for the urgency of the engine start. The numerical value may be based on a rate of driver demand torque change. If the rate of driver demand torque change is high, the numerical urgency level number may be high (e.g., 10). If the rate of driver demand torque change is low, the numerical urgency level number may be low (e.g., 3). Method 400 may also use the vehicle drive mode to adjust the numerical urgency level. For example, if the vehicle drivel mode is "sport or track," method 400 may increase the numerical urgency level by a value of one. If the vehicle drive mode is "normal or standard," method 400 may not increase the numerical urgency level. If the vehicle drive mode is "economy," method 400 may decrease the numerical urgency level by a value of one.

Method 400 may also determine a present phase or stage of engine starting. The engine starting procedure may be parsed into engine cranking and engine run-up phases or stages. The engine cranking phase may begin when the engine begins to be rotated by an electric machine without combusting air and fuel. The engine cranking phase may end and an engine run-up phase may begin when combustion begins in the engine. The engine cranking phase may end when engine speed reaches a predetermined speed (e.g., ISG speed or engine idle speed).

Method 400 also determines the basis for a present engine start request. For example, method 400 may judge that the engine start is due to a change in state of a human/machine interface, a system initiated engine start (e.g., start the engine due to low battery charge or start the engine due to low catalyst temperature), a passive change of mind, or an active change of mind. The passive and active change of mind states may be determined according to driver demand and engine speed as previously mentioned. The engine starts that are due to input to a human/machine interface may be based on an operating state of the human/machine interface.

Method 400 proceeds to 406 after determining the aforementioned operating conditions. The various operating conditions may be determined from the operating states of sensors and input devices.

At 406, method 400 adjusts the torque reserve of an electric machine (e.g., ISG 240) for engine starting according to the present vehicle operating conditions that were determined at 402 and 404. In one example, method 400 may begin with a base electric machine torque reserve that is based on the engine starting device. For example, the base electric machine torque reserve for engine starting may be 100 Newton-meters (Nm) if the ISG and driveline disconnect clutch are selected to be the engine starting device for the present or next. The base electric machine torque reserve for engine starting may be 35 Nm if the flywheel starter or the ISG is selected to be the engine starting device for the present or next engine start. The base electric machine torque reserve for engine starting values may be retrieved from controller memory when the controller memory is referenced or indexed using the selected engine starting device.

Method 400 may modify the base electric machine torque reserve according to other vehicle operating conditions to determine a final electric machine torque reserve according to the following equation:

$$T_{resfin} = T_{base}(\text{startingdevice}) + T_{En}(N) + T_{Urg}(\text{DDT}) + T_{SS}(\text{stage}) + T_{ST}(\text{type}) + T_{ISG}(N_{ISG}) + T_G(\text{gear}) + T_{DM}(\text{Drivemode})$$

where $T_{resfin}$ is the final torque reserve for engine starting that may be applied to the electric machine, $T_{base}$ is a base torque reserve for engine starting function for the electric machine, startingdevice is the engine starting device (e.g., ISG, flywheel, etc.), $T_{En}$ is the electric machine torque reserve for engine starting adjustment function for engine speed, N is engine speed, $T_{Urg}$ is the electric machine torque reserve for engine starting adjustment function for engine starting urgency, DDT is driver demand torque, $T_{SS}$ is the electric machine torque reserve for engine starting adjustment function for the present stage of the engine start, stage is the present engine starting stage, $T_{ST}$ is the electric machine torque reserve for engine starting adjustment function for the type of engine start, type of the type of engine start (e.g., active change of mind or passive change of mind), $T_{ISG}$ is the electric machine torque reserve for engine starting adjustment function for the electric machine speed, $N_{ISG}$ is the electric machine speed, $T_G$ is the electric machine torque reserve for engine starting adjustment function for the electric machine, gear is the presently engaged transmission gear, $T_{DM}$ is the torque adjustment function for the electric machine that is based on vehicle drive mode, and Drivemode is the presently selected vehicle drive mode. Thus, the aforementioned functions may be referenced or indexed by their respective arguments (e.g., DDT driver demand torque) and the functions may modify the base electric machine torque for engine starting to generate a final electric machine torque reserve for engine starting. Of course, a final electric machine torque reserve for engine starting may be determined by multipliers or by a combination of adders and multipliers using similar functions and/or control parameters. Method 400 proceeds to 408 after determining the final electric machine torque reserve for engine starting.

At 408, method 400 judges if an engine start is presently requested. An engine start may be requested via a human, a controller, or vehicle system. If method 400 judges that an engine start is not presently requested, the answer is no and method 400 proceeds to 435. If method 400 judges that an engine start is presently requested, the answer is yes and method 400 proceeds to 410.

At 435, method 400 operates the vehicle driveline with an electric machine torque reserve for engine starting as determined at 406. The electric machine torque reserve for engine starting is torque that may not be used to propel the vehicle. Rather, the electric machine torque reserve for engine starting may be applied to only start the engine via the electric machine. Thus, torque from the electric machine that is the maximum torque output of the electric machine at the present speed of the electric machine minus the electric machine torque reserve for engine starting may be applied to propel the vehicle. The output of the electric machine and engine (if presently running) may be determined according to driver demand and vehicle speed. Method 400 proceeds to exit.

At 410, method 400 judges if the presently requested engine start is a start that includes closing the driveline disconnect clutch. If so, the answer is yes and method 400 proceeds to 412. Otherwise, the answer is no and method 400 proceeds to 440.

At 440, method 400 starts the engine via cranking the engine with the flywheel starter (FWS) and the electric machine (e.g., ISG 240) may assist the flywheel starter depending on the vehicle drive mode and other operating conditions. The amount of torque that the electric machine may assist the flywheel starter with is the electric machine torque reserve for engine starting determined at step 406. The engine is supplied with fuel and spark during cranking to support combustion in the engine. Method 400 also runs the engine up to the speed of the ISG (240), or to engine idle speed, and method 400 may couple the engine to the ISG when engine speed matches ISG speed. Method 400 proceeds to 442.

At 442, method 400 judges if the engine has been coupled to the electric machine by fully closing the driveline disconnect clutch. If so, the answer is yes and method 400 proceeds to 416. If not, the answer is no and method 400 returns to 440.

At 412, method 400 starts the engine cranking the engine solely via the electric machine (e.g., ISG 240). Method 400 may crank the engine via accessing the electric machine torque reserve for engine starting that was determined and held back for engine starting at 406. The engine is cranked via at least partially closing the driveline disconnect clutch and increasing the torque output of the electric machine (e.g., ISG 240). The electric machine may also be propelling the vehicle when the engine is started. Increasing the electric machine torque output during engine starting may compensate for the amount of torque that is transferred to the engine by at least partially closing the driveline disconnect clutch. By increasing the electric machine torque when closing the driveline disconnect clutch, a continuous monotonic (e.g., continuously increasing value that does not level off or decrease) torque may be delivered to the vehicle driveline by the electric machine (e.g., ISG 240) so that a driveline torque disturbance may not be observed. Spark and fuel are also supplied to the engine. Method 400 proceeds to 414.

At 414, method 400 judges if the engine has been coupled to the electric machine (e.g., ISG 240) by fully closing the driveline disconnect clutch. If so, the answer is yes and method 400 proceeds to 416. If not, the answer is no and method 400 returns to 412.

At 416, method 400 reduces the electric machine torque reserve for engine starting to a value of zero. Reducing the torque reserve may allow the electric machine to deliver additional torque to the vehicle driveline for vehicle propulsion. Method 400 proceeds to 418.

At 418, method 400 operates the vehicle in a hybrid mode. The vehicle may be propelled solely via the internal combustion engine or via the internal combustion engine and the electric machine (e.g., ISG 240) while operating in the hybrid mode. Method 400 may select the internal combustion engine and/or the electric machine to operate based on the driver demand torque and vehicle speed. Driver demand torque may be determined from a position of a driver demand pedal. Method 400 proceeds to 420.

At 420, method 400 judges if a request to shutdown or stop engine rotation is present. An engine shutdown request may be provided via a human request made to a human/machine interface or via a controller according to vehicle operating conditions. If method 400 judges that a request to shutdown the engine is present, the answer is yes and method 400 proceeds to 422. Otherwise, the answer is no and method 400 returns to 418.

At 422, method 400 shuts down the engine. Method 400 may shutdown the engine by ceasing to deliver fuel to the engine. In addition, method 400 may fully open the driveline disconnect clutch so that engine speed may go to zero. Method 400 may also cease spark delivery to the engine. Method 400 proceeds to 424.

At 424, method 400 adjusts the electric machine torque reserve for engine starting to a predetermined shutdown torque reserve amount (e.g., 100 Nm). The shutdown torque reserve amount may allow the electric machine to increase engine speed so that engine speed matches electric machine speed in case an engine start request is made after an engine shutdown begins. For example, if an engine shutdown begins in response to a low driver demand torque and zero vehicle speed, the shutdown torque reserve may be accessed by the electric machine to increase engine speed back to the speed of the electric machine if an engine start is requested to charge the vehicle's battery after the engine shutdown begins. Method 400 proceeds to 426.

At 426, method 400 judges if an operator change of mind is present. An operator change of mind condition may be a condition where driver demand torque is increased after engine shutdown begins and before engine rotational speed reaches zero. If method 400 judges that a change of mind condition is present, the answer is yes and method 400 proceeds to 450. Otherwise, the answer is no and method 400 proceeds to 428.

At 428, method 400 judges if the engine's rotational speed is less than a threshold speed (e.g., 100 RPM). If so, the answer is yes and method 400 proceeds to 430. Otherwise, the answer is no and method 400 returns to 426.

At 430, method 400 indicates that the engine has stopped rotating. The driver demand torque may be provided via the electric machine while the engine is stopped. Method 400 proceeds to exit.

At 450, method 400 judges if an active change of mind is present. An active change of mind may be characterized by the engine speed begin below a threshold speed, engine shutdown in progress, and an increase in driver demand torque. If method 400 judges that an active change of mind condition is present, the answer is yes and method 400 proceeds to 452. Otherwise, the answer is no and method 400 proceeds to 454.

At 452, method 400 adjusts the electric machine torque reserve for engine starting based on an active change of mind. In one example, method 400 references a table or function that outputs an electric machine torque reserve adjustment or offset for an active change of mind. For example, the active change of mind may cause an increase the base electric machine torque reserve by 20 Nm when an active change of mind is determined to be present so that the electric machine may increase engine speed to the electric machine speed so that the engine need not stop rotating before the engine is restarted. As a result, the engine may start in a shorter period of time and torque may be available from the engine sooner after an active change of mind is detected. Method 400 may start the engine with the electric machine using torque that is reserved for engine starting. Method 400 returns to 412.

At 454, method 400 adjusts the electric machine torque reserve for engine starting based on a passive change of mind. In one example, method 400 references a table or function that outputs an electric machine torque reserve adjustment or offset for a passive change of mind. For example, the passive change of mind may increase the base electric machine torque reserve by 10 Nm when a passive change of mind is determined to be present so that the electric machine may increase engine speed to the electric machine speed so that the engine need not stop rotating before the engine is restarted. As a result, the engine may start in a shorter period of time and torque may be available from the engine sooner after a passive change of mind is detected. Method 400 may start the engine with the electric machine using torque that is reserved for engine starting. Method 400 returns to 412.

In this way, an electric machine torque reserve for engine starting may be adjusted for a variety of conditions to help ensure sufficient torque may be reserved to start an engine via an electric machine. The engine starting torque reserve may be modified based on engine speed, vehicle drive mode, electric machine speed, active and passive change of mind engine start conditions, and other vehicle operating conditions.

Thus, the method of FIGS. 4 and 5 provides for a method for operating a powertrain, comprising: adjusting a torque reserve amount of an electric machine via a controller in response to a characterization of a restart of an engine after beginning engine shutdown and before stopping rotation of the engine. The method further comprises restarting the engine via applying at least a portion of the torque reserve to rotate the engine via the electric machine. The method includes where the characterization includes partitioning the restart into one of two categories. The method includes where a first of the two categories is an active category. The method includes where a second of the two categories is a passive category. The method further comprises adjusting the torque reserve amount in response to an urgency level of the restart. The method includes where the urgency is based on a rate of driver demand pedal change.

The method of FIGS. 4 and 5 also provides for a method for operating a powertrain, comprising: adjusting a torque reserve amount for an electric machine via a controller in response to a selected engine cranking device and stages of engine starting. The method includes where the stages of engine starting include cranking and engine run-up. The method further comprises cranking an engine via the electric machine utilizing torque included in the torque reserve amount. The method further comprises reducing the torque reserve to zero in response to fully closing a driveline disconnect clutch. The method further comprises adjusting the torque reserve in response to an engine stop request.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A method for operating a powertrain, comprising:
adjusting a torque reserve amount of an electric machine via a controller in response to a characterization of a restart of an engine after beginning engine shutdown and before stopping rotation of the engine, wherein the characterization includes partitioning the restart into one of two categories.

2. The method of claim 1, further comprising restarting the engine via applying at least a portion of the torque reserve to rotate the engine via the electric machine.

3. The method of claim 1, where a first of the two categories is an active category.

4. The method of claim 3, where a second of the two categories is a passive category.

5. The method of claim 1, further comprising adjusting the torque reserve amount in response to an urgency of the restart.

6. The method of claim 5, where the urgency is based on a rate of driver demand pedal change.

7. A system, comprising:
an engine;
an integrated starter/generator (ISG);
a driveline disconnect clutch; and
a controller including executable instructions stored in non-transitory memory that cause the controller to adjust a torque reserve of the ISG for engine starting in response to an engine stop request.

8. The system of claim 7, further comprising additional instructions to restart the engine in response to an increasing driver demand torque.

9. The system of claim 7, further comprising additional instructions to adjust the torque reserve in response to a speed of the ISG.

10. The system of claim 7, further comprising a transmission, and additional instructions to adjust the torque reserve in response to an engaged gear of the transmission.

11. The system of claim 7, further comprising additional instructions to adjust the torque reserve in response to a vehicle drive mode.

12. The system of claim 11, where adjusting the torque reserve in response to the vehicle drive mode includes increasing the torque reserve for a sport drive mode.

13. The system of claim 12, further comprising additional instructions to adjust the torque reserve in response to a speed of the engine.

14. The system of claim 13, where adjusting the torque reserve includes decreasing the torque reserve as engine speed increases.

15. A method for operating a powertrain, comprising:
adjusting a torque reserve amount for an electric machine via a controller in response to a selected engine cranking device and stages of engine starting.

16. The method of claim 15, further comprising adjusting the torque reserve amount in response to an engine stop request.

17. The method of claim 15, where the stages of engine starting include cranking and engine run-up.

18. The method of claim 15, further comprising cranking an engine via the electric machine utilizing torque included in the torque reserve amount.

19. The method of claim 18, further comprising reducing the torque reserve amount to zero in response to fully closing a driveline disconnect clutch.

\* \* \* \* \*